United States Patent

[11] 3,592,490

| [72] | Inventor | William H. Harding |
| | | Wood County, W. Va. |
| [21] | Appl. No. | 809,364 |
| [22] | Filed | Mar. 21, 1969 |
| [45] | Patented | July 13, 1971 |
| [73] | Assignee | Textron, Inc. |
| | | Providence, R.I. |
| | | Continuation of application Ser. No. 658,840, Aug. 7, 1967, now abandoned. |

[54] MEANS FOR RENDERING FLOOR FITTINGS NONROTATABLE
5 Claims, 5 Drawing Figs.

[52] U.S. Cl. ..................................................... 285/90,
52/221, 248/OB DIG, 285/331
[51] Int. Cl. ...................................................... F16l 19/02
[50] Field of Search.......................................... 248/361,
27; 285/90; 138/92; 52/220, 221; 174/48, 49;
220/3.4; 287/20.5 R

[56] References Cited
UNITED STATES PATENTS

| 1,116,498 | 11/1914 | Schubert...................... | 248/27 |
| 2,932,683 | 4/1960 | Flachbarth................... | 174/48 |
| 3,047,650 | 7/1962 | Reiland......................... | 52/221 X |
| 3,408,094 | 10/1968 | Flachbarth................... | 285/90 |

FOREIGN PATENTS

| 478,521 | 1/1938 | Great Britain................ | 285/90 |

*Primary Examiner*—Chancellor E. Harris
*Attorney*—Frederick J. Olsson

ABSTRACT: In a floor fitting a headed nipple provided with means holding a locking screw which engages the fitting base and develops static friction forces to maintain the fitting in fixed position.

PATENTED JUL 13 1971 3,592,490

INVENTOR
William H. Harding

Frederick J. Olsson
ATTORNEY

INVENTOR.
William H. Harding
Frederick T. Olsson
ATTORNEY

MEANS FOR RENDERING FLOOR FITTINGS NONROTATABLE

This application is a continuation of my pending application, Ser. No. 658,840 filed Aug. 7, 1967 now abandoned.

This invention relates to underfloor distribution systems and in particular relates to mechanism to prevent the turning of floor fittings.

Floor fittings of the kind in question ordinarily comprise a receptacle housing mounted on a base which is held down on the floor by a nipple threadingly engaged with an insert either of the preset or after-set type.

Field experience with this kind of floor fitting has shown that a nipple or nut acting against the base cannot be relied upon to maintain the fitting in a fixed position, i.e., prevent the base from turning. For example, in most instances floor fitting is situated so that the housing is subjected to severe contacts which tend to turn the housing and the base and thereby loosen the nipple or nut. Once loose, the fitting is susceptible to turning even with light contacts. Frequent turning of the fitting is hazardous particularly from the standpoint of causing loose wiring connections and/or severing of wire insulation and thereby raising the danger of fire and exposing personnel to shock.

There has been considerable effort to develop means to prevent the turning of a floor fitting. Many of these have involved the use of the key principle, i.e., a rigid member keyed between the nipple and some other part of the fitting. While such structures can prevent turning they have the decided disadvantage of being relatively expensive from the standpoint of manufacturing and assembly.

With the above in mind the present invention provides a means to positively prevent a floor fitting from turning which is so astonishingly simple in structure that it adds little if anything at all to either manufacturing or assembly costs over the standard or conventional fitting not provided with antiturning means.

The invention contemplates threaded apertures in the head of the nipple and carrying one or more locking screws, one of which can be turned down to tightly engage the base and thereby develop static friction forces between the base and the floor and between the nipple, the adapter and the insert, which forces are adequate to maintain the fitting in its installed position.

The invention will be described below in connection with the following drawings wherein.

Figure 1:
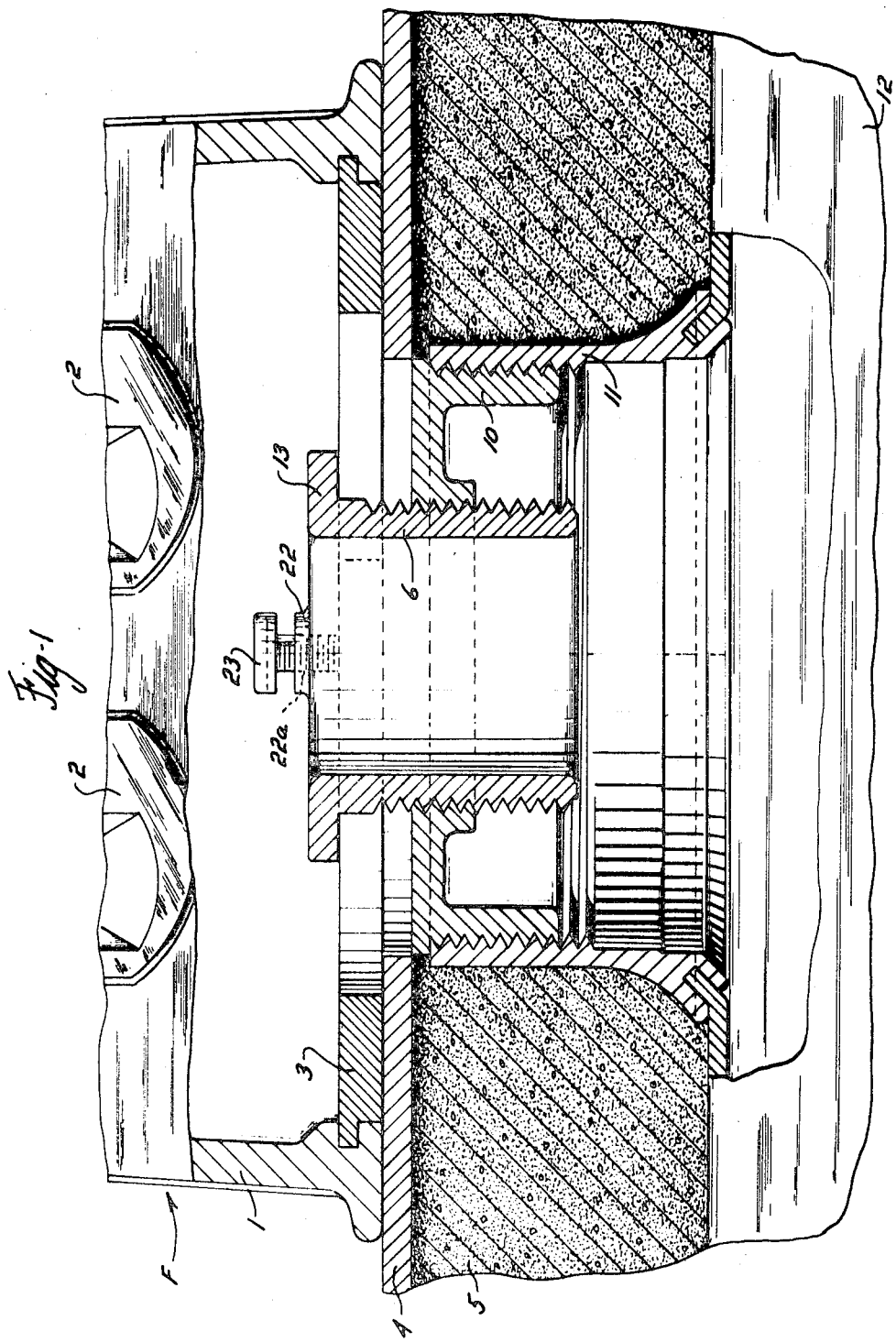
FIG. 1 is a front elevational view partially in section showing a fitting incorporating the invention.

In FIG. 1 the floor fitting F is along the lines of the fitting disclosed in Flachbarth Pat. No. 2,932,683 and comprises a housing 1 carrying receptacle 2 mounted on a base 3. The base abuts against the floor covering 4 on the concrete 5. The base is held down against the floor by the nipple 6 threaded in the adapter 10 which in turn is threaded in the insert 11 connected to the duct 12. The nipple has a hex head 13 so that the nipple can be conveniently tightened down with a wrench. As is conventional in smaller sizes, an adapter is not used and the nipple screws directly into the insert.

The base 3 has a plurality of openings 14, 15 and 16 for use in shifting the base as is explained in the above-mentioned patent. As shown, the nipple 6 is disposed in the opening 15.

Figure 3:
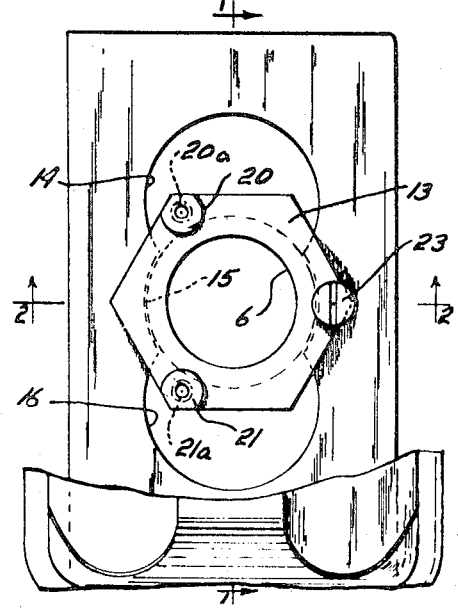
FIG. 3 is a plan view of the nipple and base structure of FIG. 1.

The top surface of the nipple is provided with a plurality of lands 20, 21 and 22 and threaded apertures 20a, 21a and 22a extend through these lands down through the head of the nipple. As shown in FIG. 3 the aperture 22a is open to the top surface of the base. The aperture 22a carries a clamping screw 23.

During assembly (after the nipple has been turned down to lock the base against the floor) the clamping screw 23 is turned down so that it tightly engages the base. Preferably, the base is made from a softer material than the screw so that the screw actually bites into the surface. The screw bears downwardly on the base and pulls upwardly on the nipple and thereby develops static friction forces between the base and the floor and between the threads of the nipple, the adapter and the insert. In addition, the biting action of the screw in the base prevents the nipple and base from turning relative to one another.

Actual tests conducted with floor fittings having an antiturning arrangement of the kind described have shown that the fittings are firmly locked into position and will not turn even with severe blows by the foot.

It is pointed out that the nipple has a plurality of threaded holes to insure that one or more of the threaded holes will be open to the base when the nipple is tightened up. This structure is particularly important when the base has adjusting openings such as 14, 15 and 16.

Also it is to be noted that the nipple may be of two part construction comprising a body threaded into the adapter and a nut or head threaded on the body and engaging the base. As will be understood by those skilled in the art the body is sometimes referred to as the bushing and the head as a locknut.

One of the advantages of the two part construction is that the nut, being independent, is more free to bend when the clamping screw is tightened down. As a consequence, relative rotation of the bushing and nut is made substantially more difficult. The fitting is more firmly held against rotation.

A typical and highly useful application of the two part construction is for a conventional underfloor flush duct, particularly for smaller size openings wherein the thread length is limited so that less antiturning force is available.

Figure 5:
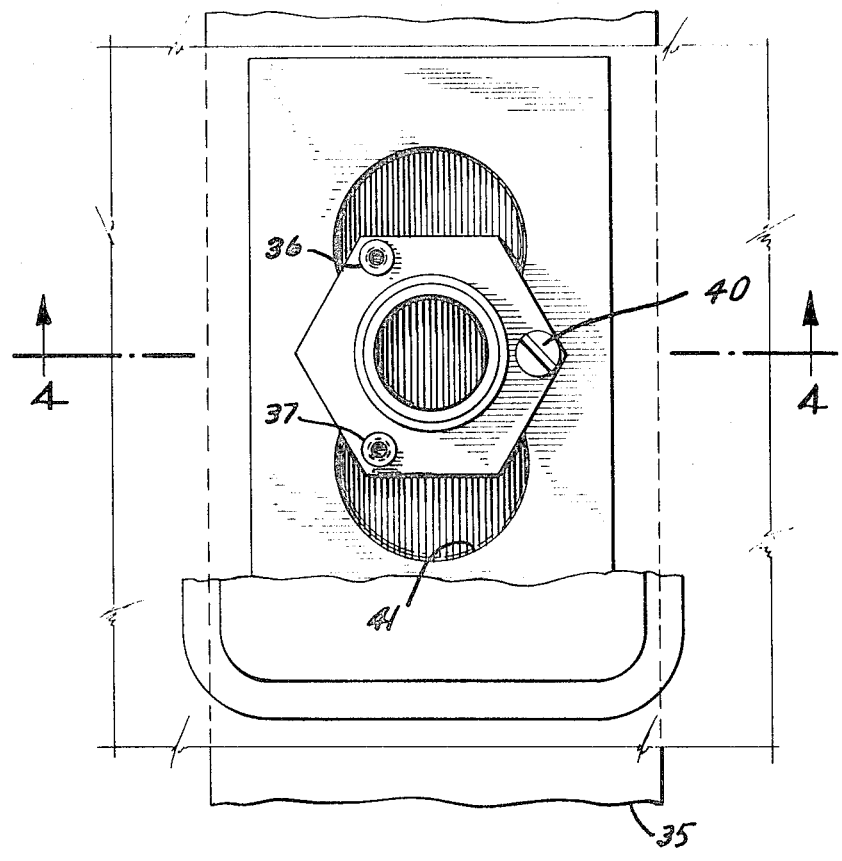
FIG. 5 is a plan view of the nipple and base structure of FIG. 4.
Figure 4:
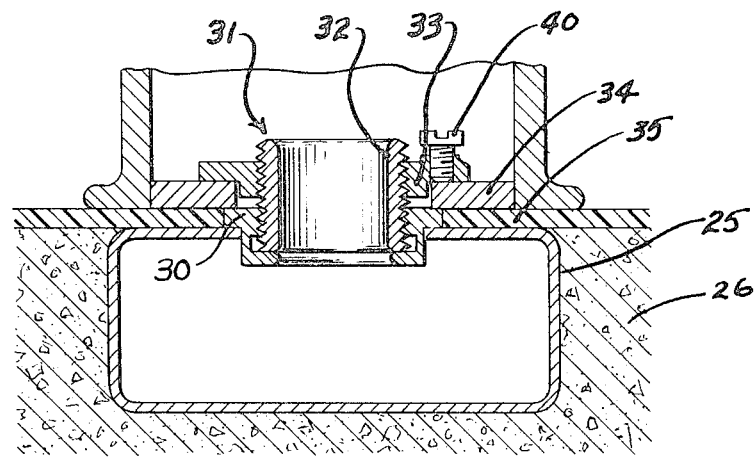
FIG. 4 is a sectional elevational view showing the invention as applied to underfloor flush duct.

The invention as applied to an underfloor flush duct is typically illustrated in FIGS. 4 and 5 where the flush duct 25 is imbedded in the concrete 26. An insert 30 is mounted in an opening on the top of the duct. When the insert is placed in the opening, the bottom portion is expanded against the duct so that the insert is immovable. The insert carries the two part nipple 31 comprising the bushing 32 and nut 33. As indicated, the nut bears on the base plate 34 supported on the tile or floor 35.

As best indicated in FIG. 5, the nut 33 has three threaded holes, two of which are respectively indicated at 36 and 37. The clamping screw 40 is disposed in the other hole.

Figure 2:
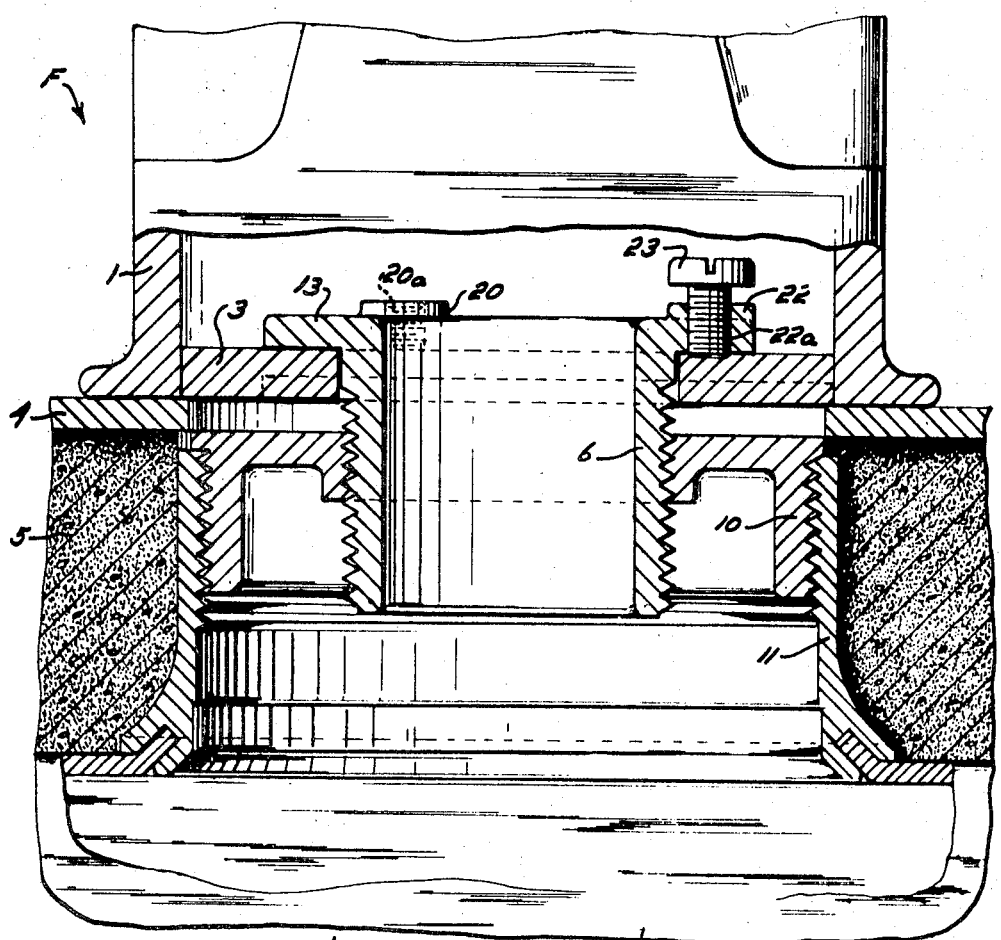
FIG. 2 is a side elevational view partially in section of the fitting of FIG. 1.

Before closing, it is pointed out that the single piece nipple shown in FIGS. 1—3 also has application in flush ducts particularly for the larger size openings where the total thread length is substantial. In these applications the insert can be eliminated and the nipple threaded directly into the access hole.

I claim:

1. In combination: an underfloor duct and mechanism for connecting a floor fitting to the underfloor duct, the mechanism including an insert having internal threads and being immovably connected to the underfloor duct; an adapter having external threads threadingly engaged with the insert threads; an apertured floor fitting baseplate disposed on the floor surface; an externally threaded nipple extending through said aperture and threadingly engaged with the adapter threads and having a head laterally projecting outwardly over the top surface of the base; a threaded hole in the head of the nipple and open to the top surface of the base; and a clamping screw in said hole and tightly engaged with the top surface of the base, the screw being turned in to push down on the base and to pull upwardly on the nipple and the adapter to cause the development of static friction forces (a) between the base and the floor, (b) between the engaged threads of the nipple and the adapter and (c) between the engaged threads of the adapter and the insert, said forces operating to prevent the base, the nipple and the adapter from turning.

2. In combination: an underfloor duct and mechanism for connecting a floor fitting to the underfloor duct, the mechanism including an insert having internal threads and being immovably connected to the underfloor duct; an apertured floor fitting baseplate disposed on the floor surface; an externally threaded nipple extending through said aperture and threadingly engaged with the insert threads and having a head laterally projecting outwardly over the top surface of the base; a threaded hole in the head of the nipple and open to the top surface of the base; and a clamping screw in said hole and tightly engaged with the top surface of the base, the screw being turned in to push down on the base and to pull upwardly on the nipple to cause the development of static friction forces (a) between the base and the floor and (b) between the engaged threads of the nipple and the insert, said forces operating to prevent the base and the nipple from turning.

3. A construction in accordance with claim 2 wherein said nipple is of unitary construction.

4. A construction in accordance with claim 2 wherein said nipple is of two part construction comprising a bushing and a head threaded on the bushing.

5. In combination: an underfloor duct and mechanism for connecting a floor fitting to the underfloor duct, the mechanism including an apertured floor fitting baseplate disposed on the floor surface; an externally threaded nipple extending through said aperture and having a head laterally projecting outwardly over the top surface of the base; means including threaded connections between the nipple threads and the underfloor duct; a threaded hole in the head of the nipple and open to the top surface of the base; and a clamping screw in said hole and tightly engaged with the surface of the base, the screw being turned in to push down on the base and to pull upwardly on the nipple to cause the development of static friction forces between (a) the base and the floor and (b) the threaded connections between the nipple and the underfloor duct, said forces operating to prevent the base and the nipple from turning.

UNITED STATES PATENT OFFICE
Certificate of Correction

Patent No. 3,592,490                                      July 13, 1971

William H. Harding

It is certified that error appears in the above-identified patent and that said Letters Patent are hereby corrected as shown below:

On the cover sheet the illustrative drawing should appear as shown below:

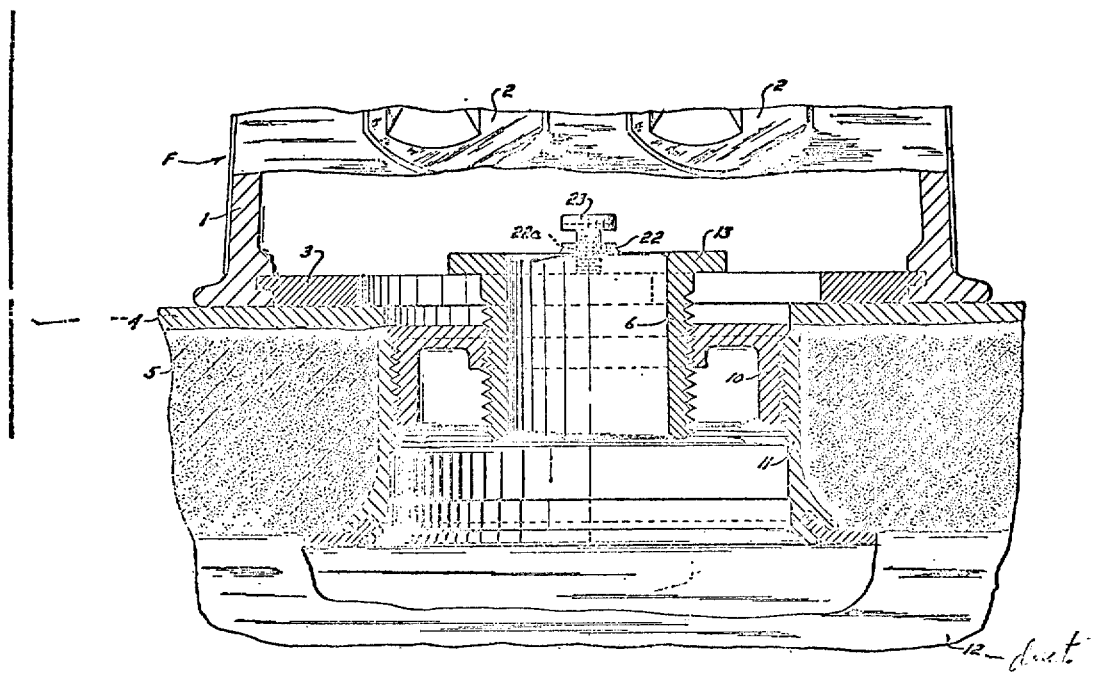

Signed and sealed this 30th day of May 1972.

[SEAL]

Attest:

EDWARD M. FLETCHER, JR.
*Attesting Officer.*

ROBERT GOTTSCHALK
*Commissioner of Patents.*